Patented Nov. 22, 1949

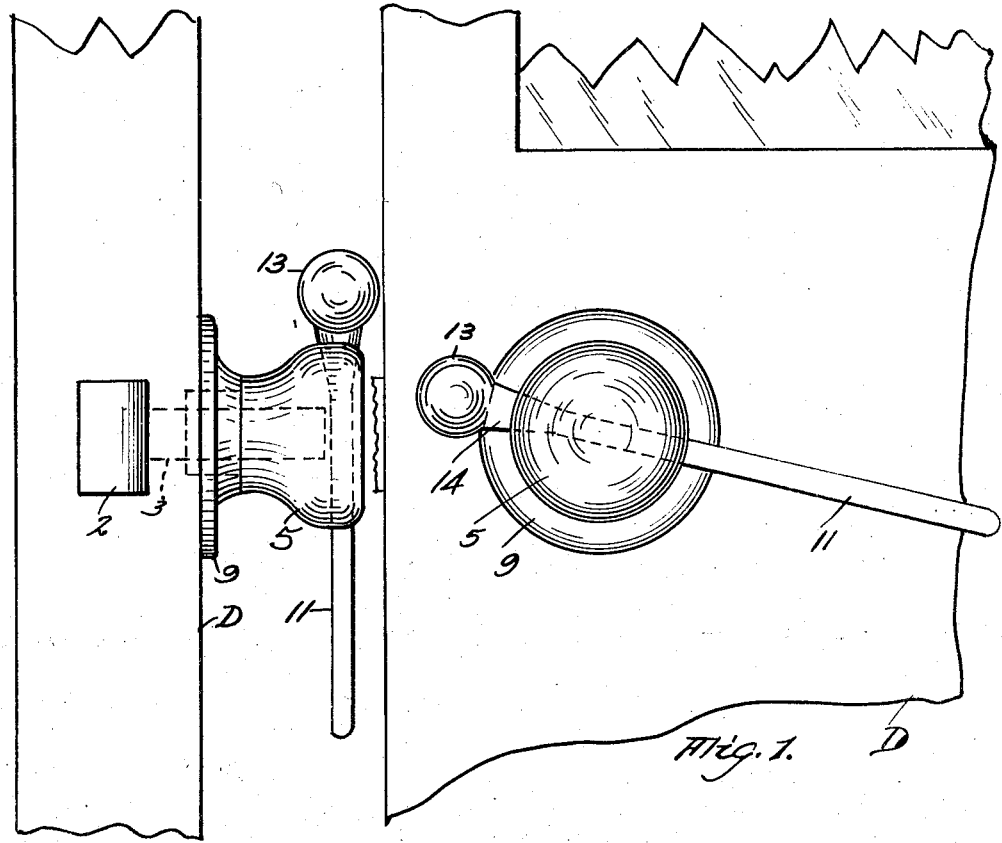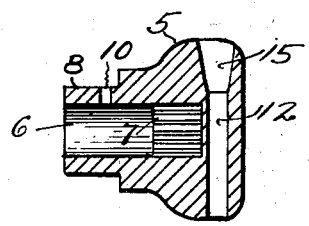

2,488,635

UNITED STATES PATENT OFFICE 2,488,635

SAFETY INSIDE VEHICLE DOOR LATCH ACTUATOR

Arthur Seymon Martin, Santa Ana, Calif.

Continuation of abandoned application Serial No. 507,343, October 22, 1943. This application October 23, 1945, Serial No. 623,918

2 Claims. (Cl. 292—347)

1

This invention is a safety, inside, vehicular door latch actuator.

It is a prime object of this invention to provide a device of this class of the utmost simplicity, low cost of manufacture and low selling price, with the object in view of helping to overcome trade resistance, bearing in mind the fact that the new actuator is, on the one side, to be offered to the trade as a door latch actuator to be applied to the door latch shaft as a substitute for use in place of the original actuator, while on the other side, it may be embodied in the original latch assembly at factory.

It is well known that indiscreet young children and irresponsible elders will often deliberately open the rear door of an automobile while it is in motion with the consequence that one or more children may be thrown or may tumble out of the vehicle, with injurious results to themselves as well as setting up a considerable traffic hazard. Again, such rear doors may be suddenly unlatched by the lurching of an occupant of the rear compartment against the usually elongate lever of latching mechanism of a door, the opening of which can easily result in injuries and property damage. In view of the just mentioned possibilities it is an object of the invention to provide a safety actuator hub which cannot be motivated by reaction of a tumbling body, animate or inanimate. And in this connection it is a special object of the invention to provide a vehicular door latch hub element expressly designed of diametrical dimension and body shape such as not to be turnable by a young child of average strength but which on the contrary can be operated by the average adult to overcome the resistance of the usual latch spring provided in the doors of vehicles, especially automobiles; this hub being of a non-extension-lever character.

At the same time it is an object of the invention to provide with a hub of this safety type a readily applicable and as readily removable extension lever which may be a normal part of the actuator until such times when the driver of the vehicle deems it desirable instantly to revert the actuator to a leverless condition, as when irresponsible beings or hazardous loads may be in the rear compartment. And a feature of the assembly of hub and handle (as the extension will be hereinafter called) is an anti-rattling structural embodiment.

This invention consists in certain advancements in this art as set forth in the ensuing disclosure and having, with the above, additional objects and advantages as hereinafter developed,

2 and whose constructions, combinations and sub-combinations, and details of means, and the manner of operation will be made manifest in the following description of the herewith illustrative embodiment; it being understood that modifications, variations and adaptations may be resorted to within the scope, spirit and principle of the invention as it is more directly claimed in the addendum.

Figure 1 is a front elevation of the actuator with its handle in idle, normal, ready position as for use by women and others not ordinarily of sufficiently strong hand muscles readily to turn the de-handled hub of the actuator.

Figure 2 is a side or edge elevation of the device with the handle turned down to latch opening position.

Figure 3 is an axial section of the hub per se.

Automobile door latches 2 are generally provided with a substantial shank 3 protruding inwardly through the door D to a sufficient degree to detachably receive a relative handle, not here shown, and to interlock axially with the same by way of one or another of various detents not needed to be here shown, since well known in the art.

The instant invention involves an actuator, for the shank, which may be factory built into the door assembly of the latch, or may readily be substituted for the original handle device when so desired. This actuator consists of a more or less knob-like hub 5 having an axial socket 6 to fit snugly onto the given shank 3 and co-rotatively interlock therewith as by means of internal spline-teeth 7. The hub 5 has a reduced boss 8 to fit turnably in a fixed face ring 9 on the inner face of the door and this boss is shown with a cross-slot 10 as one way of detent interlock with the shank—only by way of example. A distinguishing feature of the hub 5 is that it has a major diameter of such limited dimension as to render it difficult of manual turning by a young normal-strength child through direct grip thereof, but at the same time a stronger person could, with a concentrated effort, effect the rotation of the hub and therefore of the latch shank 3. In other words the special size of the hub 5 affords a means by which a safety measure is provided for protecting children, and enables the latch to be pulled back by a hand sufficiently strong upon the knob-like hub, against the normal spring stress setting the latch.

Moreover, special provision is made for the ready operation of the hub, and latch controlled thereby, for women or others too weak to turn the hub by direct grip thereon; said provision incorporating a handle 11 readily applicable to and for remaining at all times in situ on the hub, except when removed to prevent accidents as alluded to.

The handle 11 may be considered a wholly extraneous element since it is devoid of any mechanical interlock but is still provided with a feature to prevent undesired play when in place on the hub, and is non-rattling. The form of handle disclosed involves an elongate pin part to fit slidably into a through hole 12 preferably diametrically across the hub just beyond the end of the hub socket 6 so as to avoid the socket and yet be symmetrical in the hub. One end of the handle 11 has a bulbous head 13 to prevent total passage of the handle through the hub, when it is to be mounted therein for ordinary use as the latch working element of the assembly. Any suitable device may be used for holding steadily the handle 11 in the hub to avoid rattle of the handle while in place, and to that purpose the handle was a short conical neck 14 next to the head 13 to engage frictionally in a complementary nest 15 at the head end of the hub hole 12.

The member 11, which may well be called the "jury" handle, is shown at a conventional ready angle in the hub 5 in Fig. 1, while Fig. 2 discloses the handle turned down about the hub axis to release the latch. To de-handle the actuator it is necessary only to press or pull out the lever from the hub, and the dismounted handle may then be kept by the driver or placed in a safe and convenient place in the driver's compartment.

The shape of the hub is preferably peripherally symmetrical—here cylindrical—to maintain a desired maxium leverage in and of itself as a moment about the shank axis, and a suitable diameter ranges around one to one and one-half inches. The handle 11, when applied, may add some two to four inches more of leverage.

This application is a continuation of application Serial No. 507,343, filed October 22, 1943, now abandoned.

What is claimed is:

1. A knob for a door latch shank, and means to facilitate turning of the knob and including an elongate handle enlarged on one end; said knob having a through hole for readily sliding insertion and like removal of the handle, and the enlarged part of the handle having a wedging fit in the said hole to prevent rattle, said handle extending a substantial distance through the knob to provide leverage for turning the knob.

2. A vehicular door latch actuator including a rotative stem and means for rendering the door safe against hazardous opening from within the vehicle, said means including a knob fixed immovably on the stem and which is of a size to be difficult to turn for effecting latch retraction, especially by children, the knob having a through hole, and a jury handle readily insertable endwise into the hole of the knob and being freely and easily removable from the knob, and the said handle having an upper enlarged part to seat on the upper end of the hole to prevent the inserted handle from dropping through the knob in normal position of the hole, the opposite end of the handle projecting a substantial distance through the knob.

ARTHUR SEYMON MARTIN.

REFERENCES CITED

The following references are of record in the file of this patent:

UNITED STATES PATENTS

| Number | Name | Date |
| --- | --- | --- |
| 209,573 | Matthews | Nov. 5, 1878 |
| 1,399,167 | Steuerwald | Dec. 6, 1921 |
| 1,612,446 | Larson | Dec. 28, 1926 |
| 1,617,557 | Weatherhead | Feb. 15, 1927 |
| 1,764,487 | Young | June 17, 1930 |